United States Patent [19]

Tansill

[11] Patent Number: 4,676,463
[45] Date of Patent: Jun. 30, 1987

[54] MEANS FOR FUEL HANDLING AND STORAGE HAVING INCREASED SAFETY

[76] Inventor: Horace A. Tansill, P.O. Box 480, Santa Barbara, Calif. 93102

[21] Appl. No.: 792,743

[22] Filed: Oct. 30, 1985

[51] Int. Cl.⁴ .............................................. B64D 37/32
[52] U.S. Cl. .............................. 244/129.2; 244/135 R; 244/135 B; 220/88 R; 220/89 B; 137/74
[58] Field of Search ........... 244/135 R, 135 C, 135 B, 244/128, 129.2; 220/80 R, 88 B, 89 B; 137/72, 74; 521/82, 907

[56] References Cited

U.S. PATENT DOCUMENTS

| | | | |
|---|---|---|---|
| 2,850,083 | 9/1958 | Frost | 220/88 R |
| 3,804,292 | 4/1974 | Chiti | 220/88 B |
| 4,294,279 | 10/1981 | Wgeth | 244/135 R |
| 4,548,956 | 10/1985 | Schwarz | 521/907 |

Primary Examiner—Galen Barefoot
Attorney, Agent, or Firm—Millen & White

[57] ABSTRACT

A fuel holding apparatus and method utilizes a plurality of capillaries which actually confine the fuel. The fuel holding method and apparatus can be used in vehicles and high performance aircraft to reduce the likelihood of an explosive ignition of the fuel in a crash situation.

22 Claims, 6 Drawing Figures

MEANS FOR FUEL HANDLING AND STORAGE HAVING INCREASED SAFETY

BACKGROUND OF THE INVENTION

This invention relates to means for storing fuels, particularly volatile engine fuels such as are used in a wide variety of engines, e.g., those in vehicles, e.g., automobiles, trucks, tanks, aircraft, generators, compressors, etc. Particularly, this invention relates to means for holding fuels in vehicles themselves or major storage facilities which reduce the danger of explosion, e.g., when a vehicle is involved in a crash or a facility suffers a catastrophic event.

While great advances have been made in the design and performance of high speed vehicles, particularly in the design and performance of jet aircraft for commercial and military applications, crashes still frequently result in explosions when a fuel tank ruptures and spills its contents. In such cases, the flammable fuel comes in contact with air. Sparks caused by the friction of metal on metal or metal against other surfaces or other heat sources can ignite the fuel and turn an otherwise survivable crash into a deadly inferno.

The explosive combustion of jet fuel is a particular problem with respect to commercial aviation. The survivors of a crash must frequently find an exit from a very large plane under conditions in which pandemonium typically reigns. The time between fuel ignition after crash and substantial or total envelopment of the plane by the resultant flames is all too frequently much too short to allow potential crash survivors to escape. Even if the resulting fire is contained, which is unlikely, the poisonous gases and particulate matter resulting from even a limited fire can take a heavy toll. Recent tests conducted under the auspices of the federal government in which a commercial jet was crashed at a desert test site point up the limitations of today's technology in preventing such results. In those tests a fuel designed to have reduced flammability completely engulfed the plane in a matter of seconds. Accordingly, there remains a long-felt, and as yet unmet, need to improve vehicle safety, particularly aircraft safety, as well as fuel storage safety in general, by reducing the danger of a post-crash or other fuel explosion.

SUMMARY OF THE INVENTION

Accordingly, it is an object of this invention to provide means for storing fuel, e.g., a liquid which can explode when combined in appropriate mixtures with air under appropriate conditions of temperature pressure.

It is another object of the invention to provide such a fuel storage means which significantly enhances the safety of fuel storage and minimizes the probability of an explosion of the fuel while in storage or when exposed to a destructive force.

It is a further object of this invention to provide such a means which enhances safety by minimizing the chances for such an explosion even upon exposure of the tank to catastrophic failure.

It is yet another object of this invention to provide such a means which can be used in moving vehicles while retaining said safety aspects.

It is still a further object of this invention to provide such a means having various optional features which further decrease the likelihood of an explosion and/or minimize the scope of any ensuing fires.

Upon further study of the specification and appended claims, further objects and advantages of this invention will become apparent to those skilled in the art.

These objects have been achieved by providing a means suitable for storage of fuel, especially fuel which is subject to explosion upon admixture with air under appropriate conditions of temperature and pressure, comprising a multiplicity of capillaries, the fuel being stored in the capillary bores.

In preferred aspects, the capillaries are flexible, are contained in a fuel tank on a vehicle such as an aircraft and/or are manufactured as a unitary honeycomb-like structure, e.g., as shown in FIG. 1 having hexagonal cross-sections, inter alia. In an optional embodiment of this invention, a blowing agent is incorporated into the capillary walls. Upon exposure of the walls to high temperatures such as those experienced during a fire, the blowing agent decomposes, releasing non-combustible gases, e.g., $CO_2$, $H_2O$, $N_2$, etc. (These will tend to lessen the effects of the fire on the fuel storage means and/or contribute to extinguishing the fire.)

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
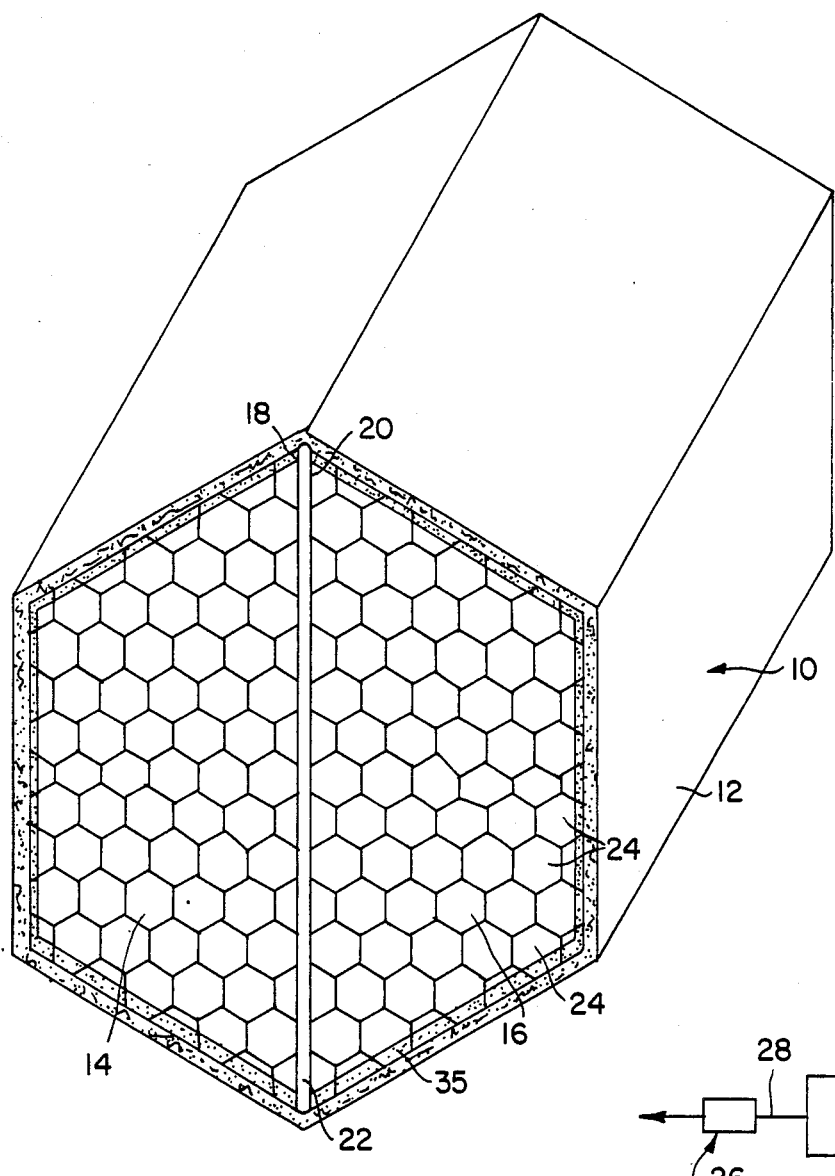
FIG. 1 is a view in perspective of a preferred embodiment of the invention involving a honeycomb-type arrangement ot full, fuel-containing capillaries.

Herein, the term "capillary" has its usual meaning, e.g., a tube having a bore sufficiently small that capillary action occurs upon contact of the tube with a liquid fuel. As is well-known, the smaller the inner diameter of the tube, the greater the length of liquid which can be held in the tube via capillary action. Any inner diameter which effects the necessary capillary action in the capillary tube in conjunction with liquid fuels can be utilized within the scope of this invention. Preferably, the largest internal dimensions of the capillaries will be 0.01 inch or smaller. In general, the smaller the diameter the better the results in accordance with this invention.

The walls of the capillary tubes can be made of any compatible material, e.g., any material which is impervious and sufficiently chemically resistent to the fuels being contained therein. Suitable materials, especially polymeric materials, having the necessary resistance to fuels are well-known. The presently preferred material is polyvinylidene fluoride, e.g., sold under the trademark KYNAR. However, of course, this invention is not limited to this specific material. Other possibilities include polyethylene, TEFLON, etc.

A concept which underlies this invention is based on the discovery that a heat source brought up to the end of a capillary containing flammable fuel will cause the fuel to move away from that end of the capillary without ignition of the fuel. There is, thus, a natural tendency of the fuel to move away from the source of the heat and minimize the potential danger. In addition, upon catastrophic failure of the fuel storage means, the capillary action will tend to retain fuel in the tubes thereby very significantly lessening the amount of fuel spillage and, consequently, the danger due to fuel ignition and/or explosion.

In another option of this invention, the capillaries are made of polymers which have been manufactured to be shrinkable upon exposure to heat. In this embodiment, when the heat source is brought up to an end of the capillary, not only does the fuel tend to move away therefrom, but the tube tends to constrict further and/or actually seal. This further lessens the danger inherent in the contact of fire or other source of high temperature with the fuel containing means of this invention.

The cross-sectional shape of the capillaries in general is non-critical. However, since a multiplicity of capillaries will be utilized in any practical fuel storage system, it is preferred that the shape minimize the amount of unused space. For this reason, non-circular cross-sections are preferred, e.g., hexagonal or other polygonal shapes which permit close packing with minimal free space between tubes. Such cross-sectional shapes are also preferred when the multiplicity of capillaries are manufactured by conventional extrusion means in the form of a unitary extrudate, e.g., as exemplified in FIG. 1.

The number of capillaries in any given system, of course, will be determined by the volume of fuel to be stored under the circumstances. Similar considerations will determine the length of the individual tubes, factoring in considerations of available space and weight. Generally, at least 25, 50, 100, 500, 1,000, 10,000, 50,000, 100,000 or more capillaries will be used in any configuration.

The means of this invention can also comprise a container, i.e., an outer shell. The latter is filled with the capillaries which are filled with the fuel itself. The shell of course is not necessary. Any convenient means can be used to contain the capillaries, e.g., part of the chassis of the vehicle, the wing structure of an airplane, and existing fuel tank, etc.

Typical fuels which can be used in conjunction with this invention include gasoline, kerosene, diesel fuel, aviation or jet fuel, etc. The invention is especially applicable to such highly flammable, potentially explosive fuels.

The fuel can be drawn from the capillaries when needed, for example, by conventional connection via a conventional manifold to a pump. When fuel is drawn from the capillaries, the capillary walls may tend to collapse depending on wall thicknesses. The reduction of volume within the capillary walls can be compensated for where necessary by admitting carbon dioxide, nitrogen, helium, or other non-flammable fluid or foam into the capillaries themselves to force the fuel out. The capillaries can be filled by connection via a similar manifold to the pressure end of a pump.

In a preferred embodiment, the multiplicity/plurality of the capillaries are separated into sections, usually 2, which are themselves separated by a fuel free space. See FIG. 1. In operation, the fuel is pushed out of the capillaries by admission of non-flammable fluid into the fuel free space. This exerts pressure on and forces the fuel from the capillaries and facilitates withdrawal of the fuel. This technique can be used above or in conjunction with a separate pump for withdrawing fuel. When the storage means is subsequently refilled with fuel, the non-flammable fluid substance can be returned to a reservoir, for example, a bladder or tank to be re-used. The engine exhaust itself may be used as the non-flammable fluid and the reservoir eliminated. Use of this non-flammable fluid has the additional advantage in case of a fire of tending to extinguish it.

A presently preferred embodiment of the invention will now be described with reference to FIGS. 1 and 2. In FIG. 1 the fuel holding means 10 comprises an optional outer shell 12. The capillaries are arranged in two compartments, 14 and 16. Flexible inner walls, 18 and 20 are optional. The terminal capillaries themselves can serve the same function. When walls are used, they can be made of a conventional flexible polymeric material such as an elastomer which will serve as a bladder-type means. Between the compartments is a fuel free space. Each compartment comprises a plurality of fuel holding capillaries 24 having flexible walls. The dimensions of the capillaries are exaggerated in the drawing for the purpose of illustration. This configuration can also be achieved in a doughnut-like fashion. Capillaries will fill the outer annular region; the latter will surround an interior fuel free space.

As can be seen in FIG. 1, the use of hexagonal capillaries permits packing within a compartment in a honeycomb fashion without substantial void space. The latter would undesirably reduce the fuel holding capacity of the fuel holding means. This packing arrangement permits easy collapse of the capillaries as the fuel is withdrawn.

Figure 2:
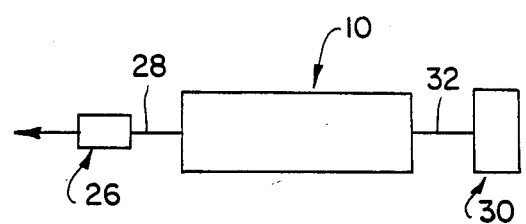
FIG. 2 is a schematic representation illustrating one use of the means of this invention in conjunction with a fuel holding tank and a pump.

Turning now to FIG. 2, there is shown an application of the fuel holding means as part of a fuel handling system useful, for example, in a jet aircraft or other vehicle. In FIG. 2, a fuel pump 26 withdraws fuel from the fuel holding means 10 through line 28. A holding tank 30 contains a non-flammable fluid which may be air but is preferably a gas such as carbon dioxide, nitrogen or helium which does not form a flammable mixture with the fuel. Alternatively, a fire supressant foam can be held in tank 30. The holding tank can be connected to fuel free space 22 within fuel holding means 10 by way of line 32. The fluid can be pressurized into the fuel free space by a conventional pump not shown. Alternatively, pump 26 can be used to withdraw the non-flammable fluid from the tank into the fuel free space instead of being used directly to withdraw fuel from the capillaries. Holding tank 30 is optional and can be eliminated when engine exhaust gases are used as the non-flammable fluid.

Figure 3:
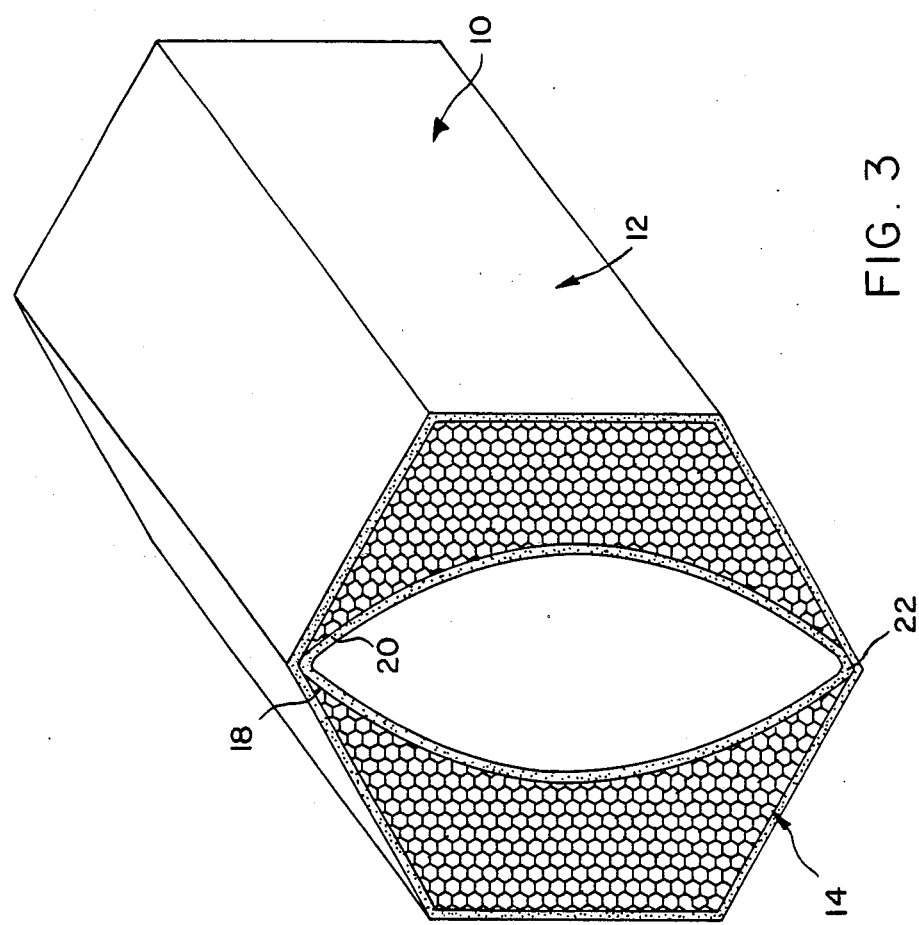
FIG. 3 is a view of the configuration of FIG. 1 when fuel is partially withdrawn from the capillaries.

In FIG. 1, the capillaries are shown when the tank is filled with fuel. In operation, as fuel is withdrawn from fuel holding means 10 by pump 26 to fuel the engines (not shown) the non-flammable fluid is admitted to space 22 under pressure. In conjunction with conventional metering equipment, this provides a fully convenient means for accurately controlling fuel flow to the engines. Within space 22 it expands and gradually collapses compartments 14 and 16, i.e., exerts pressure on capillaries 22 within these compartments, to force fuel out. See FIG. 3. This assists in withdrawing the fuel from the capillaries in normal operation, e.g., in conjunction with a conventional suction pump fuel withdrawl system attached to the capillaries by conventional manifolding means. Of course, the pressuring technique via space 22 can be used alone to withdraw fuel.

The foregoing process is merely reversed when it is necessary to refill the tank with fuel. Thus, the fluid within space 22 can, if desired, be returned to holding tank 30 using a suction pump. This facilitates refilling. Alternatively, refilling of the capillaries by separate pumping action will force the fluid from space 22 into holding tank 30. Any loss of a non-flammable fluid between refuelings can be compensated for by replenishment of the contents of tank 30 as required.

The fuel-containing capillaries 24 are preferably made of a polymeric material, preferably one of a high halogen content to reduce its flammability. The polymer can contain fire retardant additives which are conventional, e.g., $Sb_2O_3$ or many others where appropriate. Polyvinylidene fluoride is a presently preferred mateiral. In circumstances where hydrogen fluoride generated by the thermal decomposition of polyvinylidene fluoride may create an unacceptable risk, a non halogenated polymer such as polyethylene, particularly high density polyethylene may be used. As discussed above, many other compatible materials can also be used.

The capillaries may be bonded together from individual capillaries but are preferably extruded as a single unit to form, in a single extrusion, at least one of the compartments within the fuel holding means. Two such units can be inserted within shell 12 and bonded to the shell to form the structure 10 of FIG. 1. Alternatively, the two compartments shown in FIG. 1 can be extruded in a single extrusion in which case an appropriate provision is made for extrusion of the space 22. The same applies to the doughnut configuration.

In a particularly preferred embodiment, the capillaries are fabricated from a heat recoverable polymer which shrinks in diameter when heat is applied as mentioned above. This has a sealing action on the capillary ends which tends to maintain the fuel inside the capillaries during the emergency. Also, a "blowing" agent or flame retardant which releases non-flammable gas (e.g., $N_2$, $CO_2$, $H_2O$, etc.) at high temperature can be incorporated into the walls of the entire structure. Alkali metal carbonates such as sodium bicarbonate, rubidium carbonate, etc. are useful for this purpose. Other high temperature decomposing carbonates, e.g., alkaline earth metal carbonates, e.g., calcium carbonate can also be used in appropriate circumstances. Upon release of the gaseous agent at an appropriately high temperature, the internal surface of the tubes will become spongelike thereby further effecting capillary sealing.

The outer shell 12 can be made of a material which tends to deform before failing in a crash. One suitable material is polystyrene. It can also be fabricated of a polymeric material such as polyvinylidene chloride, polypropylene, etc., which has been reinforced as needed with a suitable filler to give it the desired mechanical properties. The selection of a suitable filler, which includes well known mineral fillers, carbon blacks, and the like, is well within the skill of the art.

In another preferred embodiment of the invention, outer shell 12 has a composite structure, e.g., of two layers. The outer layer is the material previously described. An inner layer 35 comprises a heat shrinkable polymeric material forming an envelope about the inner compartments 14 and 16. In a crash, as flame approaches the heat shrinkable envelope, it will tend to shrink around and seal the inner fuel containing compartments from the flames if the tank has been ruptured. Again polyvinylidene fluoride is the material of choice for the heat shrinkable liner. It can be manufactured highly conventionally in heat shrinkable form. The liner may further compirse a heat activated blowing agent as described above. In this way, a further reduction of the possibility of an explosive emission of fuel within the tank 10 can be achieved.

The fuel holding means of the invention will significantly reduce the danger of explosions when used as a fuel tank of, for example, high speed aircraft. Because the capillaries collapse when fuel is withdrawn, no air is adjacent to the fuel in the capillaries to ignite the fuel upon impact and subsequent rupture of the outer shell. Furthermore, confinement of fuel in the multiple capillaries prevents a rapid spilling of the fuel upon impact and rupture of the tank. Additionally, as the aircraft undergoes shearing stress upon impact, that shearing stress will tend to first stretch the capillaries before they break and reduce their diameter. Thus, if the capillaries do break, the diameter of the end of the capillary will be significantly reduced which will further slow the leakage of fuel from the capillaries and facilitate sealing and capillary action Additionally, the fluid within space 22, if the fuel tank ruptures, would be released and tend to bathe the area of the rupture with a non-flammable blanket which would further inhibit the ignition of lost fuel after the crash.

Figure 4A:
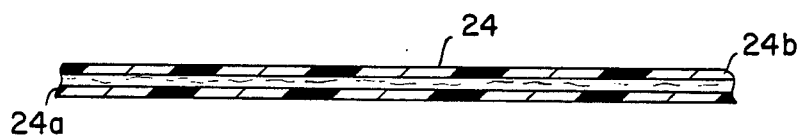
FIG. 4a shows a cross section through a length of capillary tube containing fuel in accordance with the instant invention.
Figure 4B:
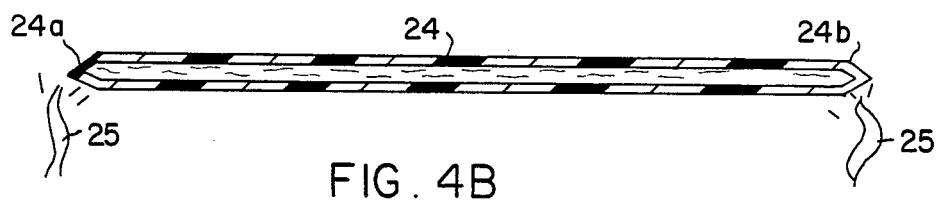
FIG. 4b shows a cross section through a length of capillary tube containing fuel wherein heat from a fire is applied to the ends of the tube to seal the tube.
Figure 4C:
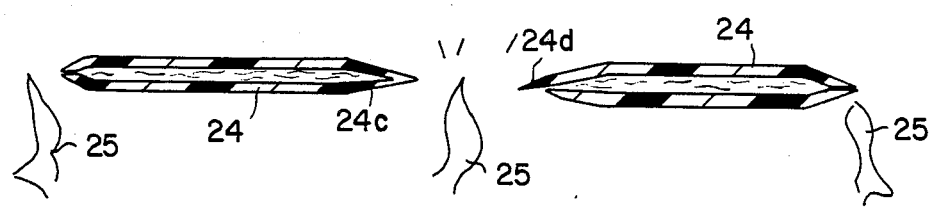
FIG. 4c shows a cross section through a length of capillary tube containing fuel wherein heat from a fire is applied intermediate the ends of the capillary tube which heat severs the tube and constructs the tube so as to form seals at the ends of the severed portions.

As is seen in FIGS. 4A–4C, upon application of heat from sources such as flames 25, the ends 24a and 24b of each of the capillary tubes 24 shrink and seal retaining the liquid fuel therein and reducing the risk of a configuration. As is seen in FIG. 4C, should heat 25 be applied intermediate the ends of the capillary tube 24, the tube will rupture and seal at 24c and 24d retaining fuel in the resulting two sections of the capillary tube.

Many modifications of the basic concept of this invention will be apparent. For example, the fuel holding mean can be subdivided into more than the two compartments shown in FIG. 1. In other embodiments, plural fuel holding means can be combined, for example to provide a plurality of modular fuel tanks within a wing structure of an aircraft or in an automobile or tank, etc.

The capillary fuel holding system of this invention can also be retrofitted into existing fuel tank installations, e.g., in vehicles, aircraft, storage tanks, etc. This can easily be accomplished utilizing capillaries whose walls are flexible. This procedure can be facilitated by first filling the capillaries with a conventional filler material which will provide the capillaries with sufficient resistance to kinking during the manipulations required to retrofit the tank. The conventional material can be removed later using solvents or by heating to fluidize it rendering it susceptible to flow under pressure.

Fabrication of the capillary systems of this invention with heat shrinkable walls mentioned above can be accomplished using the processing conditions fully conventional for making normal heat shrinkable tubing. For example, an extruded system such as that displayed in FIG. 1 can be extruded using a normal polymer such as polyvinylidene fluoride. Thereafter, the polymer can be conventionally cross-linked under conditions employed during the manufacture of heat shrinkable tubing. This is followed by a conventional heat treatment step which expands the polymer into a configuration where it retains strain. The latter is the basis upon which the polymer subsequently shrinks when exposed to a temperature adequate for release of the strain. These processing conditions combine nicely with the embodiment of this invention wherein a blowing agent is retained in the polymer. All of the temperatures involved in the mentioned processing will be lower than that at which the blowing agent decomposes to release non-flammable gases. Thus, the blowing agent can be incorporated into the polymer in the initial stages with no subsequent effect during processing as long as the amounts incorporated do not adversely affect other polymeric properties.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A fuel-containing means comprising a plurality of capillary tubes containing flammable fuel, the capillary tubes are formed about longitudinal axes and have walls made of material which is flexible and stretchable wherein the tubes can flex about and stretch with respect to the longitudinal axes thereof.

2. A fuel-containing means of claim 1, comprising at least one-hundred of said tubes.

3. A fuel-containing means of claim 1, comprising at least one thousand of said tubes.

4. A fuel-containing means of claim 1, containing fuel for a vehicle.

5. A fuel-containing means of claim 1, containing jet fuel.

6. A fuel-containing means of claim 1, wherein the capillary tubes are comprised of polyvinylidene fluoride.

7. A fuel-containing means of claim 1, wherein the capillary tubes are comprised of a polymer which will shrink upon exposure to effective heat.

8. A fuel-containing means of claim 1 wherein the the walls of the capillary tubes contain a blowing agent which blowing agent releases non-flammable gas at a temperature high enough to decompose the blowing agent.

9. A fuel-containing means of claim 7 wherein the walls of the capillary tubes contain a blowing agent which blowing agent releases non-flammable gas at a temperature high enough to decompose the blowing agent.

10. A fuel-containing means comprising at least two compartments with a fuel-free space therebetween, each compartment comprising a plurality of contiguous capillary tubes having flexible walls, and means for pressurizing said fuel-free space, whereby upon pressurization, fuel contained in said tubes will be forced out.

11. A fuel-containing means of claim 6 wherein the walls of the capillary tubes contain a blowing agent whch blowing agent releases non-flammable gas at a temperature high enough to decompose the blowing agent.

12. A fuel-containing means of claim 10, wherein said tubes comprise polyvinylidene fluoride.

13. A fuel-containing means of claim 10, wherein said fuel-free space is pressurized by a non-flammable fluid.

14. A fuel-containing means of claim 13, wherein said non-flammable fluid is exhaust gas from an engine being fed by said fuel-containing means.

15. A fuel-containing means of claim 12, wherein said tubes have a hexagonal shape.

16. A fuel-containing means of claim 10, further comprising means for evacuating said fuel-free space to facilitate filling of said tubes with fuel.

17. A fuel-handling system comprising a fuel-containing means of claim 13, operatively associated therewith, means for holding said non-flammable pressurization fluid and means for pumping it into said fuel-free space, and fuel pump means for withdrawing fuel from said capillaries.

18. A fuel-containing means comprising:
an annular region surrounding a fuel-free space, the annular region comprising a plurality of contiguous capillary tubes having flexible walls, and means for pressurizing said fuel free space, whereby upon pressurization, fuel contained in said tubes will be forced out.

19. A fuel-containing means of claim 18, wherein said tubes comprise polyvinylidene fluoride.

20. A fuel-containing means of claim 18, wherein said tubes have a hexagonal shape.

21. A method of decreasing the likelihood of an explosion upon catastrophic failure of a fuel-holding means, comprising containing the fuel in a plurality of capillary tubes wherein the capillary tubes are flexible stretchable andseal upon application of heat to open end portinos thereof.

22. Apparatus for containing and dispensing fuel, the apparatus comprising:
a plurality of flexible and stretchable capillary tubes for storing the fuel, the tubes having walls of heat shrinkable material defining small diameter capillary cavities therewithin, wherein the fuel is contained within the capillary cavities and wherein the walls constrict and seal the cavities upon application of heat sufficient to sever the tubes;
means for surrounding the plurality of tubes to define a container for containing the fuel, and
means for applying pressure within the container for forcing the fuel from the container to dispense the fuel.

* * * * *